United States Patent [19]

Morrow, Jr.

[11] Patent Number: 5,022,046
[45] Date of Patent: Jun. 4, 1991

[54] NARROWBAND/WIDEBAND PACKET DATA COMMUNICATION SYSTEM

[75] Inventor: Robert K. Morrow, Jr., Monument, Colo.

[73] Assignee: The United States of America as represented by the Secretary of the Air Force, Washington, D.C.

[21] Appl. No.: 338,908

[22] Filed: Apr. 14, 1989

[51] Int. Cl.$^5$ .................... H04L 12/56; H04L 27/30
[52] U.S. Cl. ........................................ 375/1; 370/18; 370/60; 370/94.1; 380/49
[58] Field of Search ..................... 370/60, 94.1, 18; 375/1; 380/46, 49, 50

[56] References Cited

U.S. PATENT DOCUMENTS

| | | | |
|---|---|---|---|
| 4,096,355 | 6/1978 | Rothauser et al. | 370/93 |
| 4,291,409 | 9/1981 | Weinberg et al. | 375/1 |
| 4,692,945 | 9/1987 | Zdunek | 455/17 |
| 4,703,474 | 10/1987 | Foschini et al. | 370/18 |
| 4,748,620 | 5/1988 | Adelmann et al. | 370/94.1 |
| 4,755,986 | 7/1988 | Hirata | 370/60 |
| 4,943,973 | 7/1990 | Werner | 375/1 |

OTHER PUBLICATIONS

N. Abramson, "Development of the Alohanet," *IEEE Trans. on Information Theory;* (vol. IT-31, No. 2; pp. 119-123; Mar. 1986).
M. B. Pursley, "The Role of Spread Spectrum in Packet Radio Networks," *Proc. of the IEEE;* (vol. 75, No. 1; pp. 116-134; Jan. 1987).
Sousa et al., "A Code Switching Technique for Distributed Spread Spectrum Packet Radio Networks," *Proc. IEEE Global Comm. Conf.;* (pp. 1093-1095; Jun. 1985).
G. L. Turin, "Intro. to Spread-Spectrum Anti-Multipath Techniques and their Application to Urban Digital Radio," *Proc. of the IEEE;* (vol. 68, No. 3; pp. 328-353; Mar. 1980).
Lehnert et al., "Error Probabilities for Binary Direct-Sequence Spread-Spectrum Communications with Random Signature Sequences," *IEEE Trans. on Comm.;* (vol. Com-75, pp. 87-98; 1/87).
Leiner et al., "Issues in Packet Radio Network Design," *Proc. of the IEEE;* (vol. 75, No. 1; pp. 6-20; 1/87).
Davis et al., "Performance of Slotted Aloha Random Access With Delay Capture and Randomized Time of Arrival," *IEEE Trans. on Communications;* (vol. Com-28, pp. 703-710; 5/80).
Fischer et al., "Wide-Band Packet Radio Technology," *Proc. of the IEEE;* (vol. 75, No. 1; pp. 100-115; 1/87).
Berlekamp et al., "The Application of Error Control to Communications," *IEEE Communications Magazine;* (vol. 25, No. 4; pp. 44-57; 4/87).
Birk et al., "Code-Assignment Policies for Multi--Receiver Nodes in CDMA Packet Radio Networks," *Proc. of IEEE INFOCOM '86;* (pp. 415-423, 4/86).

*Primary Examiner*—Bernarr E. Gregory
*Attorney, Agent, or Firm*—Bernard E. Franz; Donald J. Singer

[57] ABSTRACT

The best features of narrowband and wideband signaling are merged to provide a simple and reliable multiple-access network. This is done by transmitting the header of the packet using narrowband signaling coupled with an associated channel access protocol such as carrier-sense multiple-access. The data portion of the packet is then sent as a spread-spectrum signal with a spreading sequence that is common to all nodes in the network. The narrowband headers allow easy monitoring of channel loading and busy nodes while acting as a synchronization aid to the wideband signal. The multiple-access capability of spread-spectrum signaling increases channel throughput dramatically over a conventional narrowband-only system, and the anti-multipath feature allows increased data transmission rates on a multipath-prone channel. Common spreading sequences simplify transceiver design and allow packet broadcasting on the network.

4 Claims, 2 Drawing Sheets

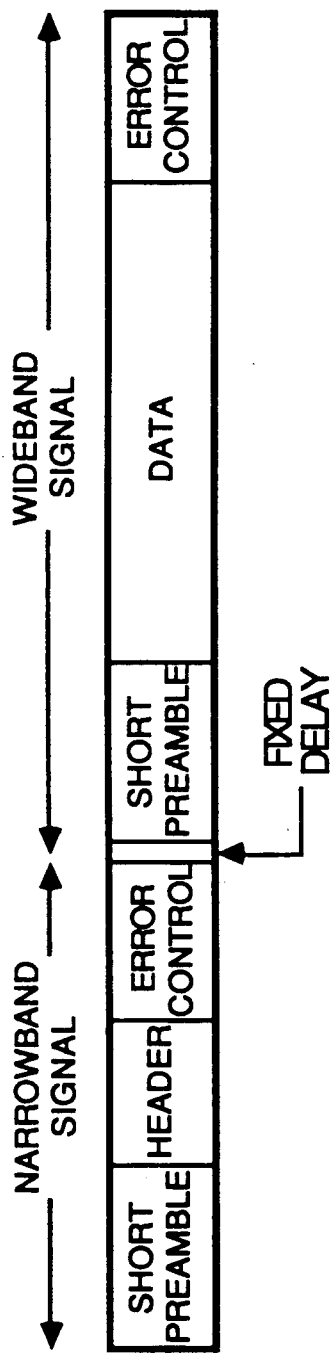
Fig. 3 Packet word format
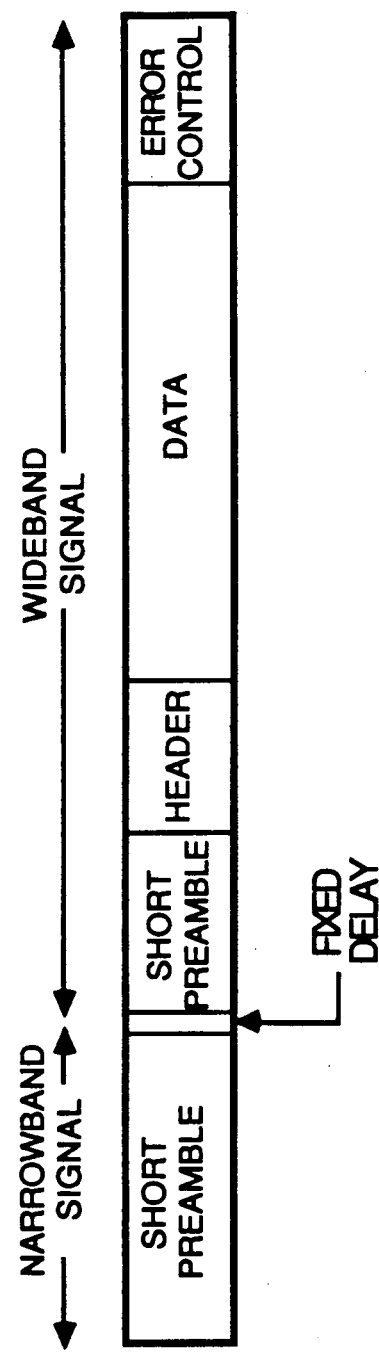
Fig. 4 Alternate packet word format

NARROWBAND/WIDEBAND PACKET DATA COMMUNICATION SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates to a narrowband/wideband packet data communication system.

Introduction to Packet Radio

Packet radio systems have become widely used for many forms of digital communication. Although various channel access protocols exist, the underlying trait of all packet systems is a shared communication channel, and stations are allowed access to this channel when they have something to transmit. Sometimes access is allowed without requiring the sender to determine whether the channel is already in use. Various methods are employed to handle the inevitable interference, or "collision", which occurs when more than one user transmits simultaneously. Since a collision usually results in either partial or complete packet destruction, packet retransmission is the normal recovery technique. Collisions can still occur even if a potential user first checks the channel for the presence of another's signal, since propagation and receiver response delays could give an erroneous indication of a clear channel. If collisions are properly handled and their packet transmission rate is kept low enough so that the channel doesn't saturate, the packet communication concept is desirable when limited channel resources preclude assigning each user pair its own dedicated channel.

Introduction to Spread-Spectrum Signaling

Spread-Spectrum Signaling may be used to reduce the effect of a collision by deliberately increasing the bandwidth of all users of the channel through either direct-sequence or frequency-hopping methods. When a signal is processed in this manner, multiple-access capability is achieved; that is, multiple users can transmit together without necessarily causing mutually destructive interference.

Direct-sequence spread-spectrum is a method of increasing the bandwidth of a digital signal by superimposing upon the data a second set of binary signals, or chips, which change state much more rapidly than the data itself. This spreading signal is called a signature sequence, and has certain correlation properties which allow the receiver to synchronize on the transmitted signal and extract the data, while rejecting the interference caused by other users. Frequency-hopped spread-spectrum signals are generated by rapidly changing the carrier frequency in an attempt to avoid interference from the other users. If the hopping pattern is chosen properly, and if the number of frequencies available is large compared to the number of simultaneous users, interference will only occur occasionally. The term spreading sequence refers to the signature sequence in direct-sequence systems, or the hopping pattern in frequency-hopped systems.

Spread-spectrum signals have other features which make them more desirable than their narrowband counterparts in a digital communication system. Among these are reduced susceptibility to detection interception and jamming in a tactical environment, improved signal capture capability (the ability of a receiver to successfully receive at least one of many overlapping messages which may be intended for it), and relative immunity from intersymbol interference caused by multipath. The characteristic of multipath rejection makes spread-spectrum systems especially useful in areas which are multipath-prone such as a typical factory setting, and allows a higher data transmission rate than could be achieved with narrowband techniques.

In the context of the above discussion, much effort has been made to couple packet radio networks with spread-spectrum signaling in an attempt to gain the advantages of both. Since generating and receiving the wideband signal adds complexity to the radios at each node in the network, it is necessary to fix transmission and channel-access protocols so that communication can proceed in an orderly fashion.

Transmission Protocols

The transmission protocol is the process that determines the selection of the spreading sequence to be used for the transmission of the packet. It is assumed that each node in the network has a radio that is compatible with the other nodes in the sense that the type of modulation and signaling technique (direct-sequence, frequency-hopped, or a combination of both), along with the packet structure, have already been determined.

A receiver-oriented protocol is based on the premise that each receiver in the network is assigned a unique spreading sequence, and all transmissions to a particular receiver must take place on that receiver's sequence. Of course, each transmitter in the network must have a copy of all sequences to the receivers with which it may eventually communicate, but receiver design is simplified since it must search for only one spreading sequence on which to synchronize. It is possible that two or more transmitters may begin sending a message to a single receiver at approximately the same time. Since the signature sequences used by both transmitters are identical, multiple-access capability no longer exists, and the packets will collide with results similar to a narrowband collision; that is, the transmitters will jam each other and both packets will be lost. Another disadvantage of the receiver-oriented protocol is the lack of packet broadcasting capability, defined here as the ability for one transmitter to send packets to more than one receiver simultaneously. With receiver-oriented protocols, a transmitter must repeat a broadcast packet (with different spreading codes) to each receiver individually, increasing channel traffic and delay.

Avoiding packet collisions and allowing broadcast capability are features of the transmitter-oriented transmission protocol, which assigns a unique spreading sequence to each transmitter in the network. Collisions are eliminated because it is impossible for two copies of the same sequence to be sent simultaneously, and packet broadcasting is possible simply by identifying more than one destination in the packet header. This protocol places a very large burden on the receiver however, since all possible spreading sequences must be searched simultaneously for incoming messages. Receiver acquisition, that is, initial receiver synchronization with the incoming spreading sequence, is already a difficult and sometimes lengthy process even when there is only one spreading sequence for a receiver to check. A large number of sequences to search can make acquisition slow and unreliable.

A third transmission protocol takes the form of a common spreading sequence for all message traffic on the network. Transmitter and receiver design is simplified accordingly, but the capture properties are worse for this protocol than for the others, since collision protection is afforded only when all packets sent on the channel are sufficiently offset in time with each other to prevent excessive interference. Because the same spreading sequence is used for all transmissions, it is possible for packets destined for different receivers to collide, a situation that was avoided in either the transmitter- or receiver-oriented protocols. However, this approach does facilitate packet broadcasting.

Channel Access Protocols

The goal of a channel access protocol in a traditional narrowband packet network is to avoid collisions and/or to provide adequate conflict resolution if a collision does occur. ALOHA and slotted ALOHA systems transmit either immediately or at the beginning of the next time slot following the arrival of a new packet at a node. The carrier-sense multiple-access (CSMA) protocol senses the channel and transmits a new packet only if the channel is not busy. Of these three protocols, the ALOHA or slotted ALOHA techniques are probably the most efficient for spread-spectrum packet systems, since the multiple-access nature of spread-spectrum means that the term "busy" no longer applies to the channel in the strict sense. It is perhaps more important to check if the destination receiver is busy (actively receiving a packet). However, the anti-intercept feature inherent in spread-spectrum systems makes this task somewhat difficult, especially in transmitter-oriented protocol systems, since each node must synchronize and decode at least the header of every packet to determine which receivers are busy at a particular time.

Initial Sequence Acquisition

One of the more difficult problems in spread-spectrum communications is initial receiver acquisition of the signature sequence. The problem is exacerbated in a packet system, since receiver synchronization must be reaccomplished at the beginning of each packet. False correlations with a time-shifted version of its own spreading sequence or with a portion of another user's sequence during packet transmission could cause loss of the packet.

Short spreading sequences are the easiest for a receiver to synchronize on; in fact, the sequences that are analyzed most often in the literature are those which repeat at the beginning of each data bit. Carefully chosen, short sequences will perform well in a transmitter-oriented protocol network, since packet collisions are avoided. Recall, however, that this method has other disadvantages, such as high receiver complexity, which may force a designer to select another transmission protocol. Both receiver-oriented and common spreading sequence protocols are prone to packet collision, the probability of which is inversely proportional to the length of the spreading sequence. In fact, if the sequence repeats at the beginning of each data bit, the packet will experience a collision if another packet with the same spreading code is merely in data bit synchronism with it. On the other hand, if the spreading sequence does not repeat throughout the entire packet, another data set with the same spreading code must be in packet synchronism with it for a collision to occur. It is obvious, then that a design trade-off is necessary: shorter spreading sequences allow faster acquisition but have a higher probability of packet collision than longer sequences.

The receiver acquisition problem in direct-sequence systems may be summarized as follows. For a short (say, 31 chip) sequence which repeats for each data bit, the receiver may simply duplicate the sequence in a sliding correlator, insert the composite demodulated signal (including multiple-access interference) into one end, and look for correlation peaks. When the peak occurs, the receiver assumes spreading sequence alignment in time, and can then extract the data by de-spreading the received signal. A very long signature sequence might be more efficiently checked by duplicating only a portion of the sequence in the receiver's sliding correlator and looking for a partial correlation peak; the receiver can then (hopefully) assume that it is time-synchronized with the entire sequence. To be certain of correct signature sequence phase alignment, longer sequences demand longer correlators and increased time for the receiver to gain sync. Note also that synchronization must be established for every packet transmitted in the network, unless a receiver-oriented protocol is used, since the receiver must examine each header to determine if it is the intended recipient of the data.

Conclusion

It should be apparent from the preceding discussion of spread-spectrum packet radio networks that many implementation methods have been proposed by others, all of which provide certain advantages unique to a particular protocol, and all of which suffer from significant disadvantages over some of the other protocols.

United States patents of interest include U.S. Pat. No. 4,692,945 to Zdunek, which teaches an expanded "dual-word" signaling protocol, which provides an improvement over prior "single word" signaling protocols by increasing the versatility of commands which may be communicated between components of a trunked radio system. U.S. Pat. No. 4,748,620 to Adelmann et al teaches a data transmission system in which sequence numbers accompanying the packet identifies the packet location. U.S. Pat. No. 4,755,986, to Hirata teaches a packet switching unit for separating the data packet into a header part and a data part. U.S. Pat. No. 4,096,355, to Rothauser et al teaches a method wherein several data stations use a single communication channel, and which are simultaneously ready to transmit a data packet, can send a request for channel allocation, and will be granted the channel each for one data packet transmission, all within one time frame without central control, polling, or collisions.

A bibliography of literature references of interest includes the following:

E. R. Berlekamp, R. E. Peile, and S. P. Pope, "The Application of Error Control to Communications," *IEEE Communications Magazine*, Vol. 25, No. 4, pp. 4414 57, April 1987.

Y. Birk and F. A. Tobagi, "Code-Assignment Policies for Multi-Receiver Nodes in CDMA Packet Radio Networks," in *Proc. of IEEE INFOCOM '86*, pp. 415–423, April 1986.

D. H. Davis and S. A. Gronemeyer, "Performance of Slotted ALOHA Random Access with Delay Capture and Randomized Time of Arrival," *IEEE Trans-*

*actions on Communications*, Vol. COM-28, pp. 703-710, May 1980.

J. H. Fischer et al, "Wide-Band Packet Radio Technology," in *Proc. of the IEEE*, Vol. 75, No. 1, pp. 100-115, January 1987.

J. S. Lehnert and M. B. Pursley, "Error Probabilities for Binary Direct-Sequence Spread-Spectrum Communications with Random Signature Sequences," *IEEE Transactions on Communications*, Vol. COM-75, pp. 87-98, January 1987.

B. M. Leiner, D. L. Nielson, and F. A. Tobagi, "Issues in Packet Radio Network Design," in *Proc. of the IEEE*, Vol. 75, No. 1, pp. 6-20, January 1987.

N. Abramson, "Development of the Alohanet." *IEEE Transactions on Information Theory*, Vol. IT-31, No. 2, pp. 119-123, March 1986.

M. B. Pursley, "The Role of Spread Spectrum in Packet Radio Networks," in *Proc. of the IEEE*, Vol. 75, No. 1, pp. 116-134, January 1987.

E. S. Sousa and J. A. Silvester, "A Code Switching Technique for Distributed Spread Spectrum Packet Radio Networks," in *Proc. IEEE Global Communications Conf.*, pp. 1093-1095, June 1985.

G. L. Turin, "Introduction to Spread-Spectrum Antimultipath Techniques and Their Application to Urban Digital Radio," in *Proc. of the IEEE*, Vol. 68, No. 3, pp. 328-353, March 1980.

SUMMARY OF THE INVENTION

An objective of the invention is to provide a new spread-spectrum packet radio system, which combines the best features of the previous protocols while avoiding some of their more significant disadvantages.

The invention relates to packet data communication employing features of narrowband and wideband signaling. The device in one embodiment employs a processor which is connected to incoming and outgoing signals from a data link. The processor in turn outputs signals to a modulator and a sequence generator and provides power control (optional) to a RF amplifier. Inputs to the processor are from the sequence generator and a detector. The modulator modulates the signal from the processor under the control of the sequence generator. The outputs from the modulator are fed to the RF amplifier where they are amplified and then fed to an antenna switch. From the antenna switch, the signals are fed to the antenna for propagation. Received signals from the antenna are fed to the antenna switch and thence to an RF/IF amplifier and then to the detector. From the detector, the signals are fed to the processor and then to the data link. The sequence generator provides a copy of the signature sequence to the RF/IF amplifier for de-spreading the incoming signal. There are also status signals to the sequence generator from both the detector and the modulator circuits.

Narrowband and wideband signaling are accomplished by transmitting the header of the packet using narrowband signaling coupled with an associated channel access protocol such as carrier-sense multiple-access. The data portion of the packet is then sent as a spread-spectrum signal with a spreading sequence that is common to all nodes (sub-stations) in the network. The narrowband headers allow easy monitoring of channel loading and busy nodes while acting as a synchronization aid to the wideband signal. The multiple-access capability of spread-spectrum signaling increases channel throughput over a conventional narrowband-only system and the spread-spectrum anti-multipath feature allows increased data transmission rates on a multipath-prone channel. Common spreading sequences simplify transceiver design and allow packet broadcasting on the network.

In a second embodiment of the invention a narrowband receiver is interposed between the antenna switch and the processor in order to provide a means of monitoring activity of the channel during spread-spectrum signal reception periods.

BRIEF DESCRIPTION OF THE DRAWING

FIG. 3 is a diagram of the packet format; and

FIG. 4 is a diagram of an alternate packet format.

DETAILED DESCRIPTION

The proposed system and associated protocol provide the following features:

(a) uses a simple transmission protocol;
(b) allows full broadcasting capability;
(c) facilitates initial receiver synchronization on the wideband signal;
(d) eliminates time-of-day or other master clocks for timing coordination between nodes;
(e) simplifies transmitter and receiver design;
(f) provides an easy way to sense channel traffic and associated signal powers at each receiver; and
(g) provides a simple method for network flow control.

These characteristics are achieved by assigning each user of the packet network identical spreading sequences which are much longer than the typical data bit; in fact, the sequence may not repeat over the entire packet. Additionally, the beginning of the packet, consisting of a receiver preamble and packet header, is sent via a narrowband signal, using CSMA or other appropriate narrowband channel-access protocol, followed by the remainder of the packet using spread-spectrum. Identical spreading sequences give each transmitter easy access to any receiver (or set of receivers) on the net; thus broadcast capability is supported. Initial receiver synchronization on the spread-spectrum portion of the packet is facilitated because the spreading sequence always begins at a specific moment after the header is transmitted, and the receiver thus has a relatively small window of time, independent of propagation delay, in which to concentrate its wideband signal synchronization search. Initial narrowband receiver synchronization is easy, and can typically be accomplished within the first eight-bit character transmitted. The narrowband header precludes two or more packets from jamming each other due to signature sequence alignment, since a collision of narrowband signals will cause all destinations to ignore the remainder of the packets. However, since the narrowband portion of the packet is usually short compared to the entire packet, collisions will occur much less frequently than if the system also sent the data on the narrowband channel. Note that the multiple-access capability of spread-spectrum signals allows coexistence with narrowband signals.

Block Diagram

Figure 1:
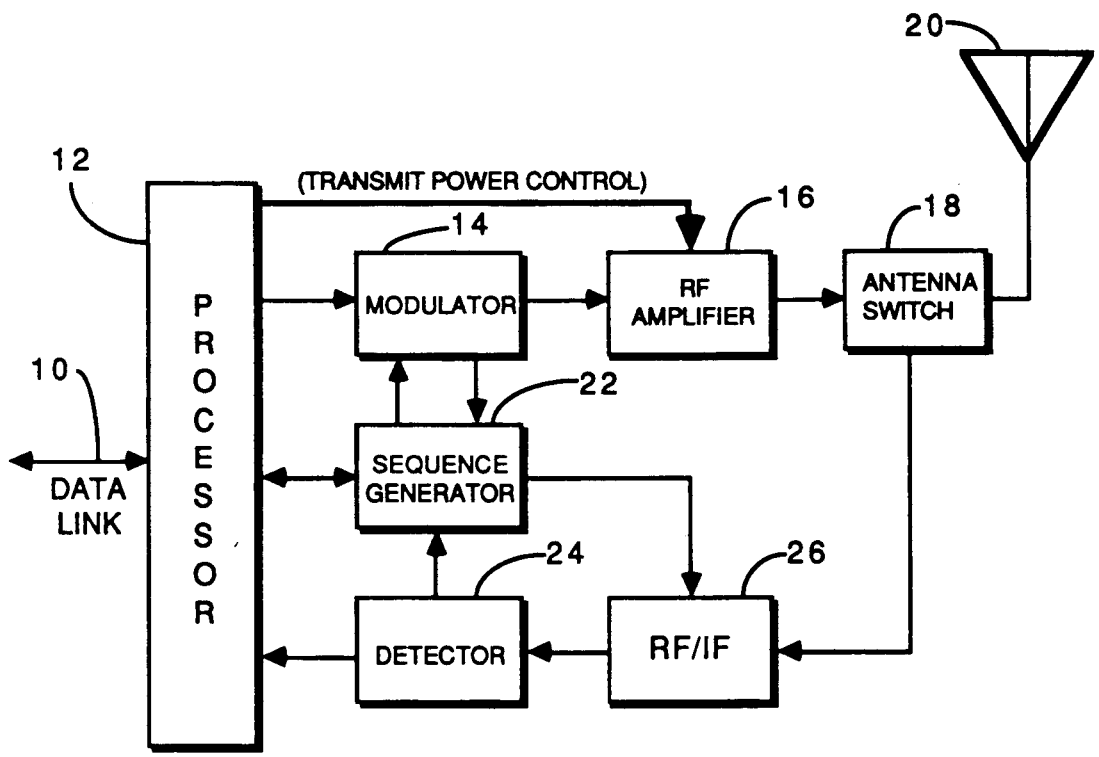
FIG. 1 is a block diagram of a packet transceiver.

A block diagram of a packet transceiver using the proposed method is shown in FIG. 1. The transceiver is capable of operating in two modes: narrowband and wideband. In the narrowband mode, a sequence generator 22 outputs a non-spreading waveform; i.e., for direct-sequence, the "all ones" code is produced, and for frequency-hopping, a single frequency is selected. When the radio is operating in the wideband mode, the sequence generator produces a long spreading sequence which is common to all radios in the network.

The transceiver employs a processor 12 which is connected to incoming and outgoing signals from a data link 10. The processor in turn outputs signals to a modulator 14 and the sequence generator 22 and provides power control to a RF amplifier 16. Inputs to the processor 12 are from the sequence generator 22 and a detector 24. The modulator 14 modulates the signal from the processor 12 under the control of the sequence generator 22. The outputs from the modulator 14 are fed to the RF amplifier 16 where they are amplified and then fed to an antenna switch 18. From the antenna switch, the signals are fed to the antenna 20 for propagation. Received signals from the antenna 20 are fed to the antenna switch 18 and thence to an RF/IF amplifier 26 and then to the detector 24. From the detector, the signals are fed to the processor 12 and then to the data link 10. The sequence generator provides the de-spreading signal to the RF/IF amplifier. There are also status signals to the sequence generator from both the detector and the modulator circuits.

Figure 2:
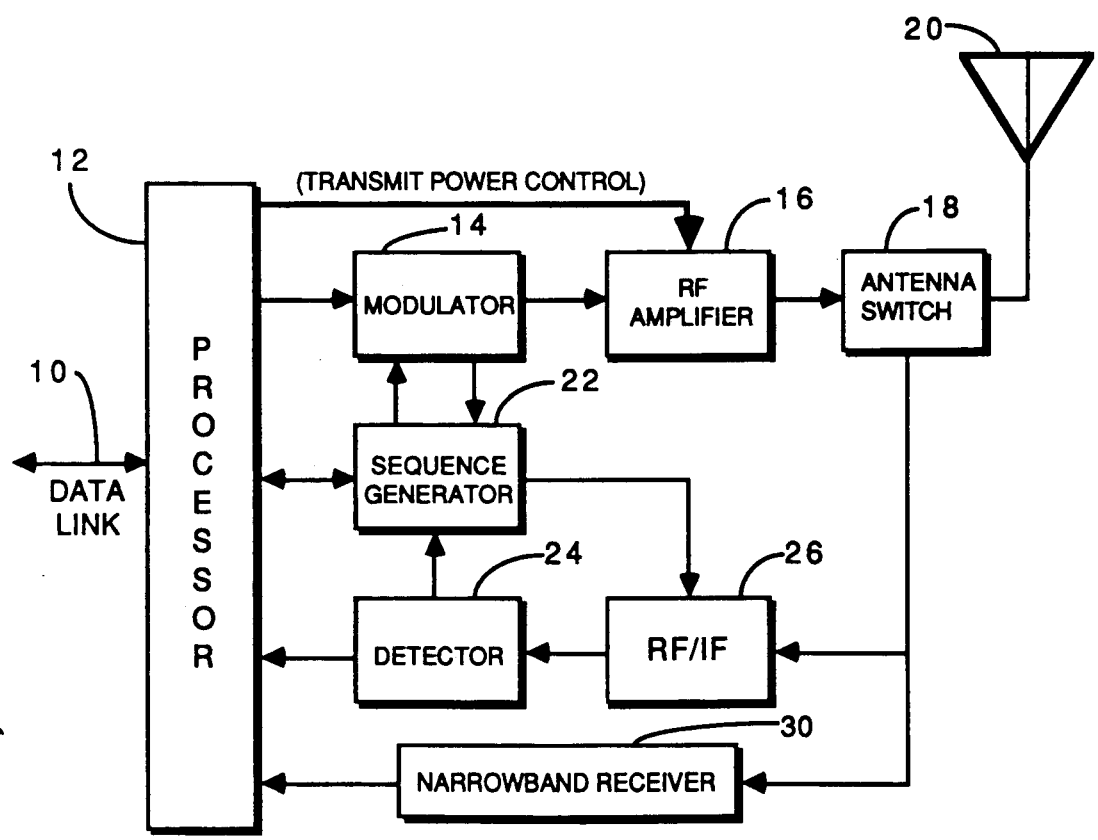
FIG. 2 is a block diagram of a packet node with a separate narrowband receiver for continuous monitoring of channel traffic.

In an embodiment of the invention shown in FIG. 2, a narrowband receiver 30 is interposed between the antenna switch 18 and the processor 12 in order to provide a means of monitoring activity of the narrowband channel during spread-spectrum signal reception periods.

Referring again to the block diagram of FIG. 1, and also to the packet format diagram of FIG. 3, data to be transmitted arrives from the data link 10 to the processor 12, where it is put into proper packet form by attaching a preamble, header, error control encoding, and any other information required by higher system protocols. Next, the narrowband channel is checked for activity by sensing the output of the receiver detector 24, and transmission begins in accordance with standard CSMA or other appropriate narrowband channel-access technique. The packet preamble and header are first transmitted narrowband, followed by the remainder of the packet with the sequence generator in the wideband mode. Wideband signal transmission may begin immediately after narrowband transmission is complete, or after a fixed delay. However, the time between the end of the narrowband signal and the start of wideband transmission is normally identical for all transmitters on the network.

Received signals arrive at the RF/IF block 26, where they are decoded in two steps. When the node is idle (not receiving a packet), the sequence generator produces the appropriate non-spreading waveform, causing the receiver to monitor the communication channel for narrowband signals. Each narrowband signal is checked by the processor 12 to determine if it contains a valid packet header, which means that the signal originated within the network and that no collision of headers occurred. If the header shows that this particular node is not the recipient of the packet, the receiver continues to monitor the narrowband channel; otherwise, the receiver switches to the wideband mode and attempts to synchronize on the remainder of the packet. Since the time between the end of the narrowband header and the beginning of the wideband signal is known and independent of propagation delay, the receiver can synchronize rapidly on the wideband signal. The processor then converts the packet into the correct data format and sends it to the user via the data link 10.

Advantages and New Features

We are now in a position to examine the features of this protocol and associated transmitter/receiver design in more detail. Since every node in the network uses the same narrowband header frequency and identical signature sequences, transmission codes are simplified. Also, full broadcast capability is supported by simply listing multiple destination node identifiers in the packet header; all specified receivers will then synchronize on the data portion of the packet together. Initial receiver synchronization is facilitated because the time between the end of the narrowband header and the beginning of the wideband data is fixed and known by all nodes in the network, and is independent of propagation delay. The blurring effect of multipath on the narrowband signal and timing errors in the transmitter and receiver are the only sources of uncertainty which prevent the receiver from knowing exactly when the wideband signal begins. Since a single spreading sequence is used for all transmissions, and the narrowband header provides a wideband acquisition aid, there is no need for a master synchronization clock between the nodes in the network, which simplifies transmitter and receiver design. Channel traffic can easily be sensed by all nodes during narrowband reception; in fact, if a node is provided with a second narrowband receiver 30 (FIG. 2) it can monitor the communication channel during wideband reception for header traffic and any associated acknowledgement packets to determine which other nodes within its range are busy, and to obtain information on channel loading.

To prevent excessive interference on the communication channel while maintaining a reliable data link with another node, a transmitter may be given the capability to adjust its power according to a scheme which usually requires some knowledge of the relative power of other users' signals. Since every packet transmission begins with a narrowband signal, each node within range can easily obtain received signal power information simply by measuring the carrier strength. The narrowband channel effectively controls access to the spread-spectrum channel, so flow control is simplified substantially; if CSMA is incorporated into the narrowband protocol, channel overload may be prevented by increasing the length of the header packets (or by transmitting dummy headers) to reduce the rate of new traffic entering the wideband channel. Flow control may be delegated to any or all nodes, since all have the capability of monitoring channel traffic except possibly while transmitting.

Alternatives

It is evident that this packet communication system incorporates the combined advantages of many other proposed systems without some of their previously discussed disadvantages. However, the system is unsuitable for use in a tactical environment, since the narrowband channel is easily intercepted and/or jammed; in fact, even accidental interference on the narrowband channel will be detrimental to network reliability. In environments which produce multipath fading, the narrowband channel will be affected to a higher degree than the wideband channel, especially if direct-sequence spread-spectrum signaling is used, and the maximum usable data rate will be higher on the wideband channel. (Recall that one of the reasons for using spread-spectrum was to obtain a higher data rate in a multipath-prone environment.) In most cases, the slower data rate for the packet header will reduce the channel throughput by only a small amount, since the data portion of the packet is usually much longer than the header. In fact, the system could be designed so that the narrowband channel carries only a short preamble as a wideband synchronizing aid, with the header and data portions of the packet being sent using spread-spectrum techniques (FIG. 4). In this manner, network throughput is increased at the expense of less network information being available on the narrowband channel.

Another design modification, that of using a dedicated receiver 30 (FIG. 2) to monitor narrowband channel activity during wideband packet reception, has already been discussed. It is also relatively easy to allow a node to transmit multiple packets simultaneously simply by creating another header and a duplicate spreading sequence for transmission of a new packet while another is being sent. Similar methods can be used to receive two or more packets simultaneously, provided, of course, that a collision of headers did not occur.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A packet data communication network with a plurality of nodes, employing features of unspread and spread signaling, wherein each node comprises a processor, a data link coupled to the processor for incoming and outgoing data signals, a transmitter comprising a modulator and an RF amplifier, with the modulator coupled to receive signals from the processor and the RF amplifier coupled to receive signals from the modulator and amplify them, means for coupling the RF amplifier to antenna means for propagation, a receiver comprising an RF/IF amplifier unit and a detector, with the RF/IF amplifier unit coupled to the antenna means for receiving signals and the detector coupled between the RF/IF amplifier unit and the processor, and a sequence generator coupled to the processor, to the modulator and to the detector, to provide control signals to and from the processor, control signals to the modulator, control signals to the RF/IF amplifier unit, status signals from the detector, and status signals from the modulator, a transmit power control line from the processor to the RF amplifier;

wherein the sequence generator includes means for outputting a given non-spreading waveform on a given unspread channel for an unspread mode, and means for outputting a given long spreading sequence which is common to all nodes in the network for a spread mode;

wherein the processor includes means for placing data signals from the data link in packet form by providing a data portion for each packet and attaching thereto a preamble, header, error control encoding, and any other information required by higher system protocols;

means for checking the unspread channel for activity by the processor sensing signals from the detector for presence or absence of an unspread signal;

wherein the modulator includes means for modulating the signals from the processor under the control of the sequence generator, beginning with transmission of the header of the packet using unspread signaling coupled with a given channel access protocol with said given non-spreading waveform on the given unspread channel, followed by transmission of the data portion of the packet as a spread-spectrum signal with said given long spreading sequence, the time between the end of the unspread signal and the start of spread transmission being identical for all transmitters on the network;

means effective when a node is idle, not receiving a packet, for causing the receiver to monitor a communication channel for unspread signals, with the sequence generator producing said given non-spreading waveform, each unspread signal being checked by the processor to determine if it contains a valid packet header, which means that the signal originated within the network and that no collision of headers occurred, and if the header shows that this particular receiver is not the recipient of the packet, the receiver continues to monitor the unspread channel; otherwise, the receiver switches to the spread mode and attempts to synchronize on the remainder of the packet; whereby since the time between the end of the unspread header and the beginning of the spread signal is known and independent of propagation delay, the receiver can synchronize rapidly on the spread signal;

means in the processor for then converting the packet into a data format and sending it via the data link.

2. A packet data communication network according to claim 1, wherein each node further includes an unspread spectrum receiver interposed between the antenna means and the processor in order to provide a means of monitoring activity of a channel during spread signal reception periods.

3. A method of packet data communication in a network, employing features of unspread and spread signaling, comprising the following steps at a node of the network:

placing data to be transmitted in proper packet form by attaching a preamble, header, error control encoding, and any other information required by higher system protocols;

checking an unspread channel for activity by sensing the output of a receiver detector, and beginning transmission in accordance with a given unspread channel-access technique, first transmitting the packet preamble and header unspread, followed by the remainder of the packet with a sequence generator in a spread mode, the time between the end of the unspread signal and the start of spread transmission being identical for all transmitters on the network.

4. A method of packet data communication according to claim 3, which further includes decoding received signals in two steps, first when the node is idle, not receiving a packet, producing a given non-spreading waveform with the sequence generator, to monitor a communication channel for unspread signals, checking each unspread signal to determine if it contains a valid packet header, which means that the signal originated within the network and that no collision of headers occurred, if the header shows that this particular receiver is not the recipient of the packet, continuing to monitor the unspread channel, and second otherwise switching reception to the spread mode and attempting to synchronize on the remainder of the packet, then converting the packet into a data format for use.

* * * * *